(12) United States Patent
Kim et al.

(10) Patent No.: US 8,517,141 B2
(45) Date of Patent: Aug. 27, 2013

(54) REDUCER OF ELECTRIC POWER STEERING APPARATUS

(75) Inventors: Ji Yeol Kim, Wonju-si (KR); Young Sock Jung, Wonju-si (KR); Young Moon Park, Wonju-si (KR)

(73) Assignee: Mando Corporation, Pyeongtaek-Si (KR)

( * ) Notice: Subject to any disclaimer, the term of this patent is extended or adjusted under 35 U.S.C. 154(b) by 337 days.

(21) Appl. No.: 12/841,878

(22) Filed: Jul. 22, 2010

(65) Prior Publication Data

US 2011/0017542 A1    Jan. 27, 2011

(30) Foreign Application Priority Data

Jul. 22, 2009    (KR) ........................ 10-2009-0066585

(51) Int. Cl.
*B62D 5/04*    (2006.01)

(52) U.S. Cl.
USPC ......... 180/444; 180/446; 384/495; 74/388 PS

(58) Field of Classification Search
USPC .............. 180/444, 446; 384/495; 74/388 PS
See application file for complete search history.

(56) References Cited

U.S. PATENT DOCUMENTS

| 7,360,467 | B2* | 4/2008 | Segawa et al. | 74/425 |
| 7,523,805 | B2* | 4/2009 | Imagaki et al. | 180/444 |
| 7,575,090 | B2* | 8/2009 | Shiina et al. | 180/443 |
| 7,748,492 | B2* | 7/2010 | Iwasa et al. | 180/444 |
| 8,066,093 | B2* | 11/2011 | Kondo et al. | 180/444 |

* cited by examiner

*Primary Examiner* — Tashiana Adams
*Assistant Examiner* — Marlon Arce
(74) *Attorney, Agent, or Firm* — McDermott Will & Emery LLP

(57) ABSTRACT

Disclosed is a reducer of an electric power steering apparatus. The disclosed reducer includes: a worm shaft bearing coupled with an end of the worm shaft's motor shaft coupling portion in such a manner that a ball coupled between an inner wheel and an outer wheel supports rotation of the worm shaft; and a first damper and a second damper which are tightly fitted in one side and the other side of the worm shaft bearing, respectively, while being insertedly-coupled with the worm shaft, so as to support the worm shaft and absorb a rattle noise transferred via the worm shaft, wherein each of the first damper and the second damper is provided with supporting plates at both sides thereof, and between the supporting plates, a damper made of an elastic material is coupled and formed. The reducer of the electric power steering apparatus reduces a rattle noise which occurs by an increase in backlash caused by abrasion of the worm and the worm wheel, or occurs by an impact transferred from a road via a wheel and the steering shaft, thereby providing a pleasant driving condition to the driver.

7 Claims, 5 Drawing Sheets

REDUCER OF ELECTRIC POWER STEERING APPARATUS

BACKGROUND OF THE INVENTION

1. Field of the Invention

The present invention relates to a reducer of an electric power steering apparatus. More particularly, the present invention relates to a reducer of an electric power steering apparatus, which can reduce a rattle noise occurring by an increase in backlash caused by abrasion of a worm and a worm wheel, or by an impact transferred from a road via a wheel and a steering shaft, thereby providing a pleasant driving condition to a driver.

2. Description of the Prior Art

FIG. 1 shows a configuration view illustrating a conventional electric power steering apparatus. As shown in FIG. 1, an electric power steering apparatus 100 includes a steering system 130 extending from a steering wheel 102 to both side wheels 126, and an auxiliary power mechanism 140 for supplying auxiliary steering power to the steering system 130.

The steering system 130 includes a steering shaft 106 whose one side is connected to the steering wheel 102 and rotates together with the steering wheel 102, and the other side is connected to a pinion shaft 108 via a couple of universal joints 104. Also, the pinion shaft 108 is connected to a rack bar 112 through a rack-pinion mechanism 110, and both ends of the rack bar 112 are connected to the wheels 126 of a vehicle through a tie rod 122 and a knuckle arm 124.

The auxiliary power mechanism 140 includes a torque sensor 142, an electronic control device 144, a motor 146, and a reducer 150. The torque sensor 142 senses a torque applied to the steering wheel 102 by a driver, and outputs an electrical signal in proportion to the sensed torque. The electronic control device 144 generates a control signal based on the electrical signal transferred from the torque sensor 142. The motor 146 generates auxiliary power based on the control signal transferred from the electronic control device 144. The reducer 150 is provided with a worm 152 and a worm wheel 156 so as to transfer the auxiliary power generated by the motor 146 to the steering shaft 106.

Accordingly, the electric power steering apparatus is configured in such a manner that the torque generated by the rotation of the steering wheel 102 is transferred to the rack bar 112 via the rack-pinion mechanism 110, and the auxiliary power generated by the motor 146 according to the generated torque is transferred to the rack bar 112.

In other words, the torque generated by the rotation of the steering wheel 102, together with the auxiliary power generated by the motor 146, allows the rack bar 112 to move in the axial direction.

FIG. 2 shows a cross-sectional view illustrating a reducer of the conventional electric power steering apparatus. As shown in FIG. 2, in the reducer 150, a worm shaft 254 formed with the worm 152 is provided, and both ends of the worm shaft 254 are provided with worm shaft bearings 257, respectively, to support the worm shaft 254. The worm shaft bearing 257 has a ball 258 combined with an inner wheel 280 and an outer wheel 270 thereof. Also, in order to prevent the worm shaft bearing 257 from playing in the axial direction of the worm shaft 254, a plug bolt 210 is fastened between a damping coupler 240 and the worm shaft bearing 257, and the plug bolt 210 is fixed by a plug nut 220.

The worm shaft 254 is configured to be connected to the motor 146 via the damping coupler 240 and to be rotated by the driving of the motor 146.

Then, at one side of the external diameter of the worm 152, the worm wheel 156 is provided in such a manner that it can be engaged with the worm 152 formed on the worm shaft 254. The worm wheel 156 is configured to be mounted to the steering shaft 106, in which to the steering shaft 106, the rotation force of the steering wheel 102 (see FIG. 1) operated by the driver is transferred, while the worm shaft 254's rotation force caused by the driving of the motor 146 is transferred to the steering shaft 106.

A gear housing 260 houses the worm 152, the worm wheel 156, and the like, and is provided with, at its one side, the motor 146 for providing the driving force to the worm shaft 254. The gear housing 260 and the motor 146 are combined with each other through a bolt 250 by a motor cover 230.

The reducer of the electric power steering apparatus, as configured above, controls the driving of a motor by an electronic control device provided in a vehicle according to driving conditions of the vehicle, and transfers a worm shaft's rotation force caused by the driving of the motor, together with a driver-driven steering wheel's rotation force, to a steering shaft. This makes it possible to keep the driver's steering driving state soft and stable.

However, the reducer of the conventional electric power steering apparatus, has a problem in that the progress in the wearing of the worm and the worm wheel rotated by the driving of the motor increases the gap between them, which causes a rattle noise due to the backlash.

Also, there is a problem in that a rattle noise occurs by an impact transferred from a road via a wheel and the steering shaft, thereby causing an unpleasant feeling for the driver during operation of the steering wheel.

SUMMARY OF THE INVENTION

Accordingly, the present invention has been made to solve the above-mentioned problems occurring in the prior art, and the present invention provides a reducer of an electric power steering apparatus, which can reduce a rattle noise occurring by an increase in backlash caused by abrasion of a worm and a worm wheel, or by an impact transferred from a road via a wheel and a steering shaft, thereby providing a pleasant driving condition to a driver.

In accordance with an aspect of the present invention, there is provided a reducer of an electric power steering apparatus, the reducer including: a worm shaft whose one side end is coupled with a motor shaft; and a worm shaft bearing coupled with an end of the worm shaft's motor shaft coupling portion in such a manner that a ball coupled between an inner wheel and an outer wheel supports rotation of the worm shaft, in which an inner circumferential surface of the inner wheel is provided with a curved inner wheel pivot.

In accordance with another aspect of the present invention, there is provided a reducer of an electric power steering apparatus, the reducer including: a worm shaft whose one side end is coupled with a motor shaft, which is provided with a curved worm shaft pivot on an outer circumferential surface of said one side end; and a worm shaft bearing coupled with an end of the worm shaft's motor shaft coupling portion in such a manner that a ball coupled between an inner wheel and an outer wheel supports rotation of the worm shaft, in which the inner wheel is coupled with the worm shaft pivot.

In accordance with a further aspect of the present invention, there is provided a reducer of an electric power steering apparatus, the reducer including: a worm shaft whose one side end is coupled with a motor shaft; a pivot bearing coupled with an end of the worm shaft's motor shaft coupling portion, in which a ball is coupled between an inner wheel and a first outer wheel, and an outer circumferential surface of the first outer wheel, and an inner circumferential surface of a second outer wheel are curvedly formed and coupled with each other to support rotation and pivot movement of the worm shaft; and a first bearing support and a second bearing support which are tightly fitted in one side and the other side of the pivot bearing, respectively, while being insertedly-coupled with the worm shaft, so as to support the worm shaft and absorb a rattle noise transferred via the worm shaft.

According to the present invention, the reducer of the electric power steering apparatus reduces a rattle noise which occurs by an increase in backlash caused by abrasion of the worm and the worm wheel, or occurs by an impact transferred from a road via a wheel and the steering shaft, thereby providing a pleasant driving condition to the driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
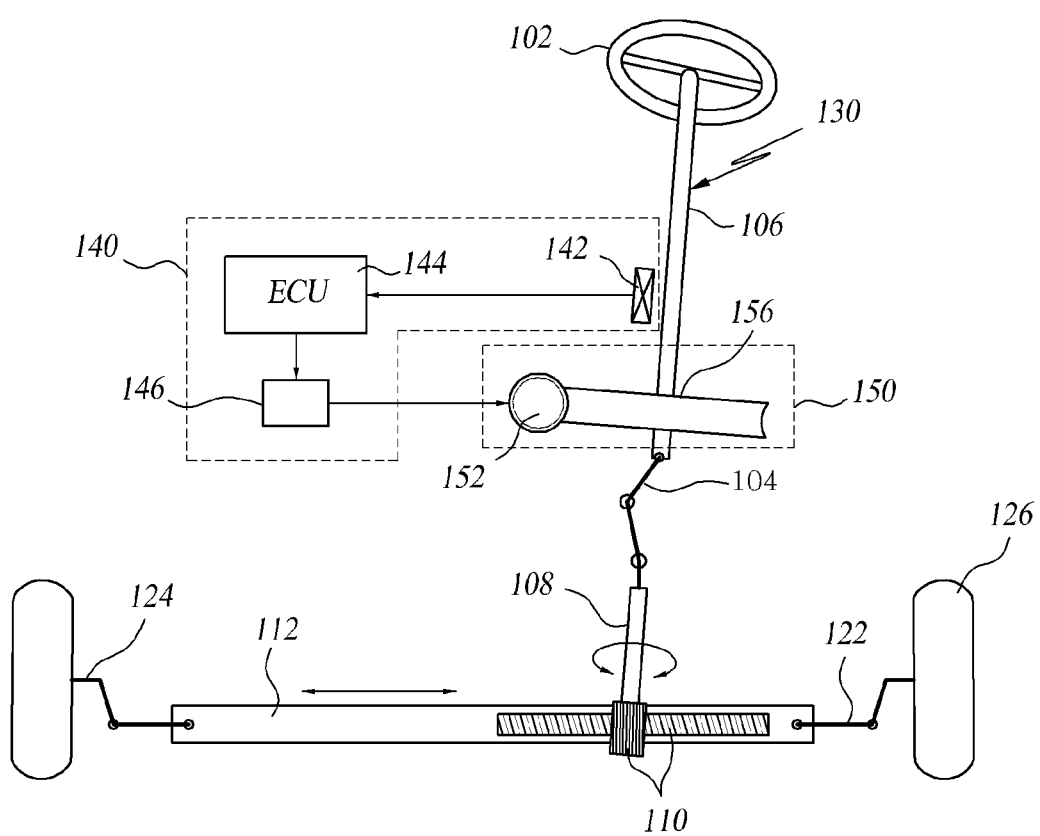
FIG. 1 shows a configuration view illustrating a conventional electric power steering apparatus.
Figure 2:
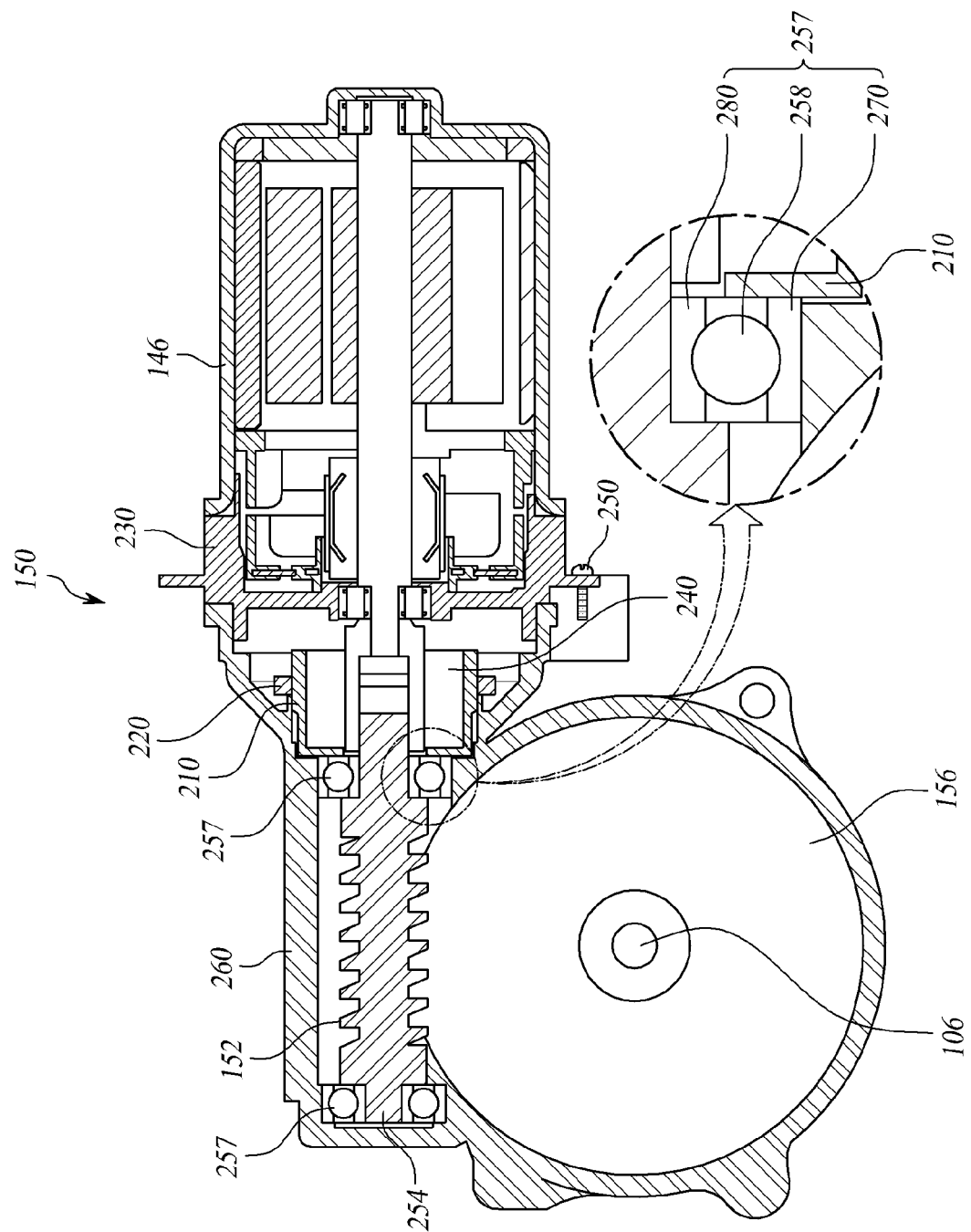
FIG. 2 shows a cross-sectional view illustrating a reducer of a conventional electric power steering apparatus.

Hereinafter, exemplary embodiments of the present invention will be described with reference to the accompanying drawings. In the following description and drawings, the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, assembled or joined to the second component.

Hereinafter, in the detailed description of the present invention, directions in components are based on the drawings for convenience of explanation.

Figure 3:
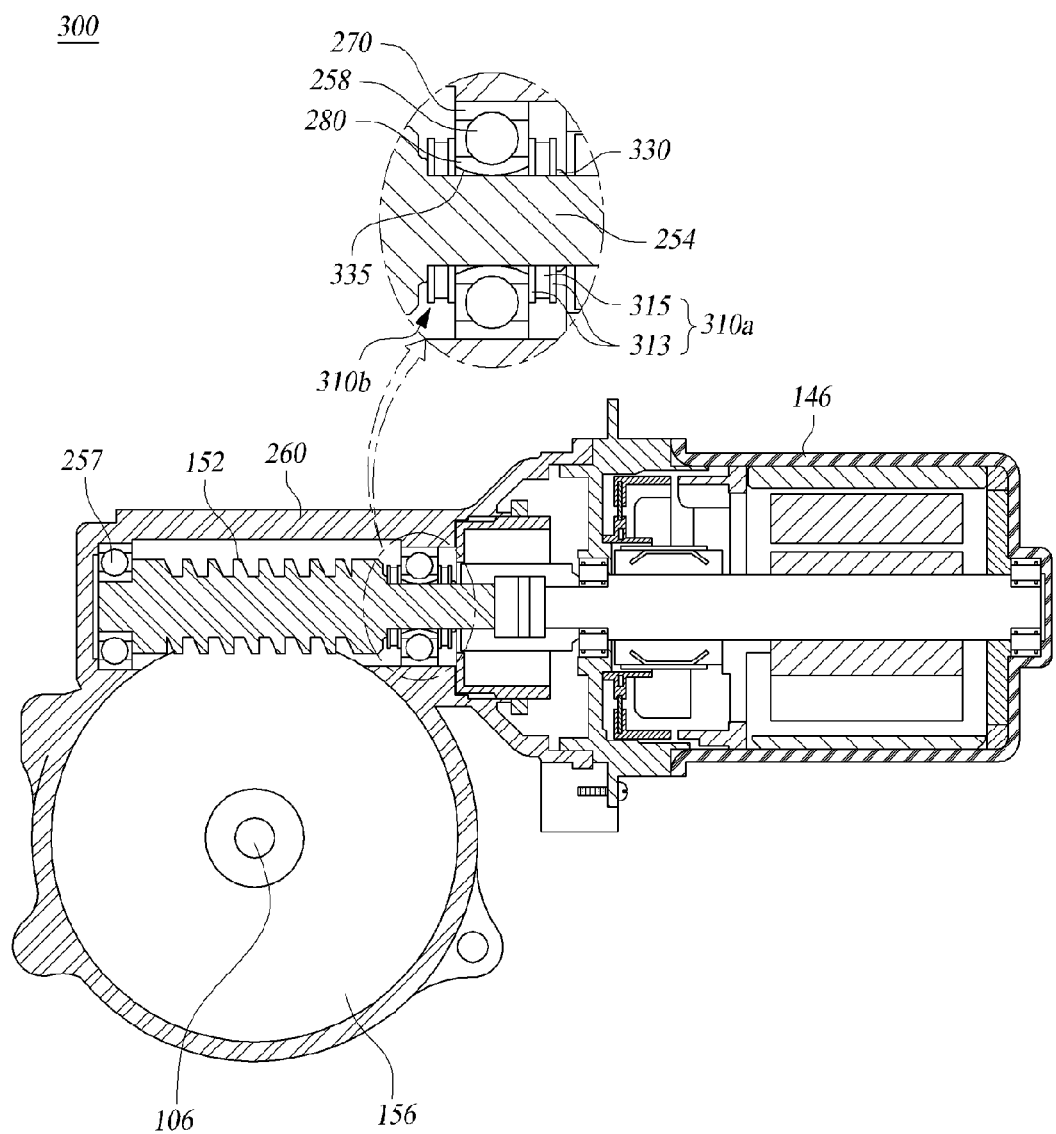
FIGS. 3 and 4 show cross-sectional views illustrating a reducer of an electric power steering apparatus, according to one exemplary embodiment of the present invention.
Figure 4:
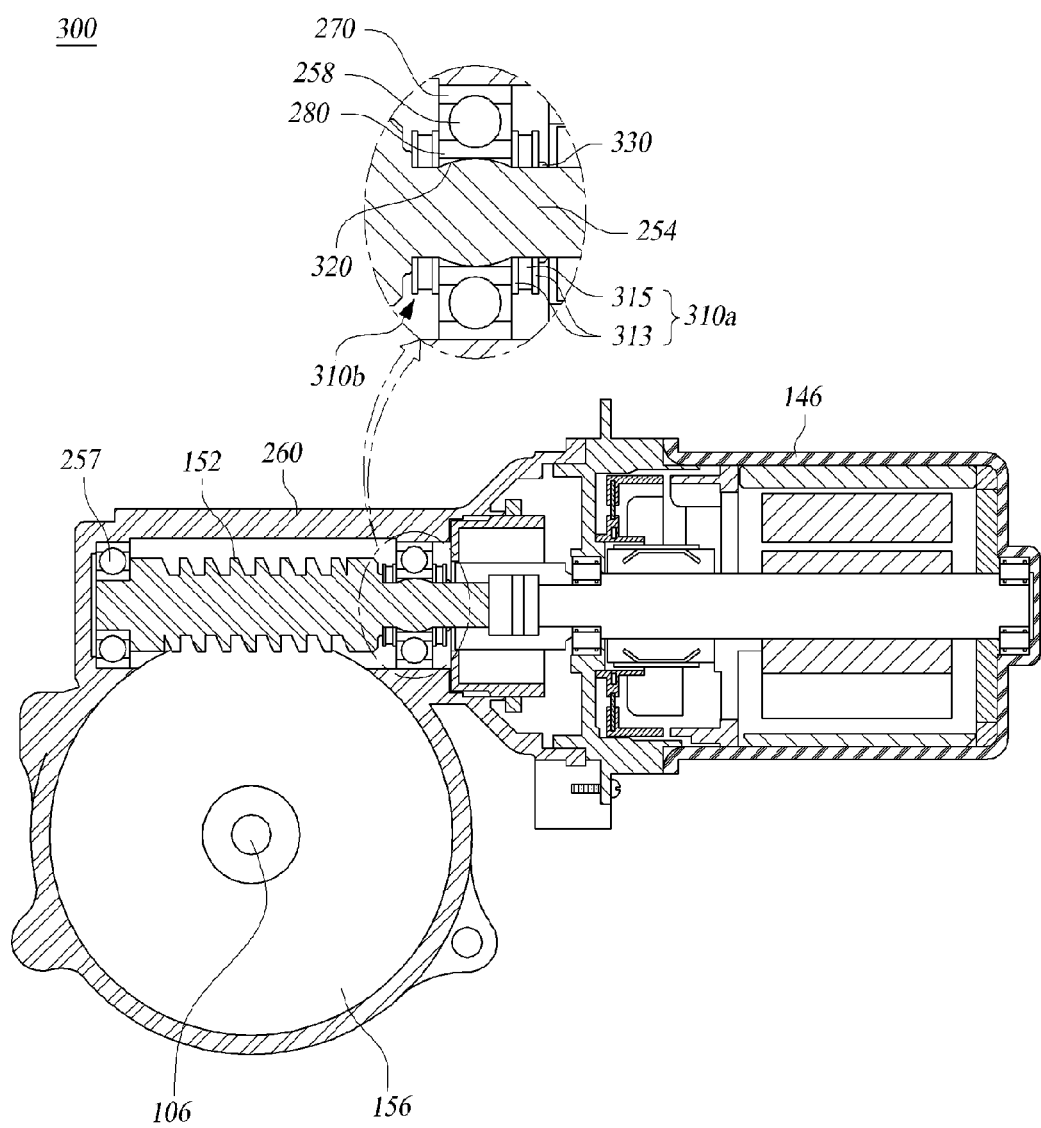

FIGS. 3 and 4 show cross-sectional views illustrating a reducer of an electric power steering apparatus, according to one exemplary embodiment of the present invention.

As shown in the drawings, a reducer 300 for an electric power steering apparatus, according to one exemplary embodiment of the present invention, includes: a worm shaft 254 whose one side end is coupled with a motor shaft; a worm shaft bearing 257 coupled with the end of the worm shaft 254's motor shaft coupling portion in such a manner that a ball 258 coupled between an inner wheel 280 and an outer wheel 270 supports the rotation of the worm shaft 254; and a first damper 310a and a second damper 310b which are tightly fitted in one side and the other side of the worm shaft bearing 257, respectively, while being insertedly-coupled with the worm shaft 254, so as to support the worm shaft 254 and absorb a rattle noise transferred via the worm shaft 254.

In the reducer 300, a worm 152 and a worm wheel 156 interlock by a driving force of a motor 146, and thereby rotate a steering shaft 106, which assists a steering force of a driver. Both ends of the worm shaft 254 interlocking with the shaft of the motor 146 during the driving of the motor 146 are fastened with the worm shaft bearings 257 so as to support the rotation of the worm shaft 254. Meanwhile, the worm wheel 156 and the worm 152 interlocking with the steering shaft 106 are embedded in a gear housing 260.

The worm shaft bearings 257 are mounted inside the gear housing 260, and at both ends of the worm shaft 254, support the rotation of the worm shaft 254. The ball 258 rotates between the inner wheel 280 and the outer wheel 270 of the bearing while reducing the rotation resistance of the worm shaft 254.

The worm 152 and the worm wheel 156 which transfer a steering-assist force generated from the motor 146 to the steering shaft can rotate by interlocking only when there exists a backlash. The backlash is maintained in a minimized amount at the early stage. However, once the wearing of the worm shaft 254 is increased by the rotation, the amount of the backlash is increased due to the playing caused by abrasion of the worm 152 and the worm wheel 156.

Especially, since the worm 152 is mainly made of a steel material, and the worm wheel 156 is mainly made of a plastic material, the rattle noise caused by the backlash f the worm 152 and the worm wheel 156 has a loud resonance noise and provides an unpleasant feeling to the driver. Herein, at both sides of the worm shaft 254, the first damper 310a and the second damper 310b absorb the vibration, thereby lowering the resonance noise.

Each of the first damper 310a and the second damper 310b, lowering the resonance noise of the rattle noise, is provided with supporting plates 313 at both sides thereof. Between the supporting plates 313, a damper 315 made of an elastic material is integratedly coupled and formed, and a caulk 330 or a snap ring (not shown) is coupled with the surface of the worm shaft 254 so as to prevent these components from separating.

The damper 315 is made of an elastic material, such as rubber, silicon, urethane, or the like, and may be pressed fitted between the supporting plates 313. Otherwise, in a state where the above mentioned elastic material is melted, the damper 315 may be formed by being injected between the supporting plates 313 and hardened.

Also, the worm shaft bearing 257 is provided with an inner wheel pivot 335, or a worm shaft pivot 320, in such a manner that the worm shaft 254 can perform pivot movement for rotating at a predetermined angle with respect to the motor shaft coupling portion. The inner wheel pivot 335 is projectingly tapered and curvedly formed toward the worm shaft 254, on the inner circumferential surface of the inner wheel, while the worm shaft pivot 320 is projectingly tapered and curvedly formed toward the worm shaft bearing 257, on the outer circumferential surface of the worm shaft 254 into which the inner wheel of the worm shaft bearing 257 is inserted.

Accordingly, when an impact transferred from the road via a wheel and the steering shaft 106 is transferred to the worm wheel 156, the worm shaft 254 tooth-meshing with the worm wheel 156 can absorb the impact through pivot movement for rotating at a predetermined angle with respect to the motor shaft coupling portion. Furthermore, when the worm shaft bearing 257 is assembled with the worm shaft 254, application of a pre load from the worm shaft 254 toward the worm wheel 156 makes it possible to reduce a rattle noise caused by an increase in backlash due to abrasion of the worm wheel 156.

Figure 5:
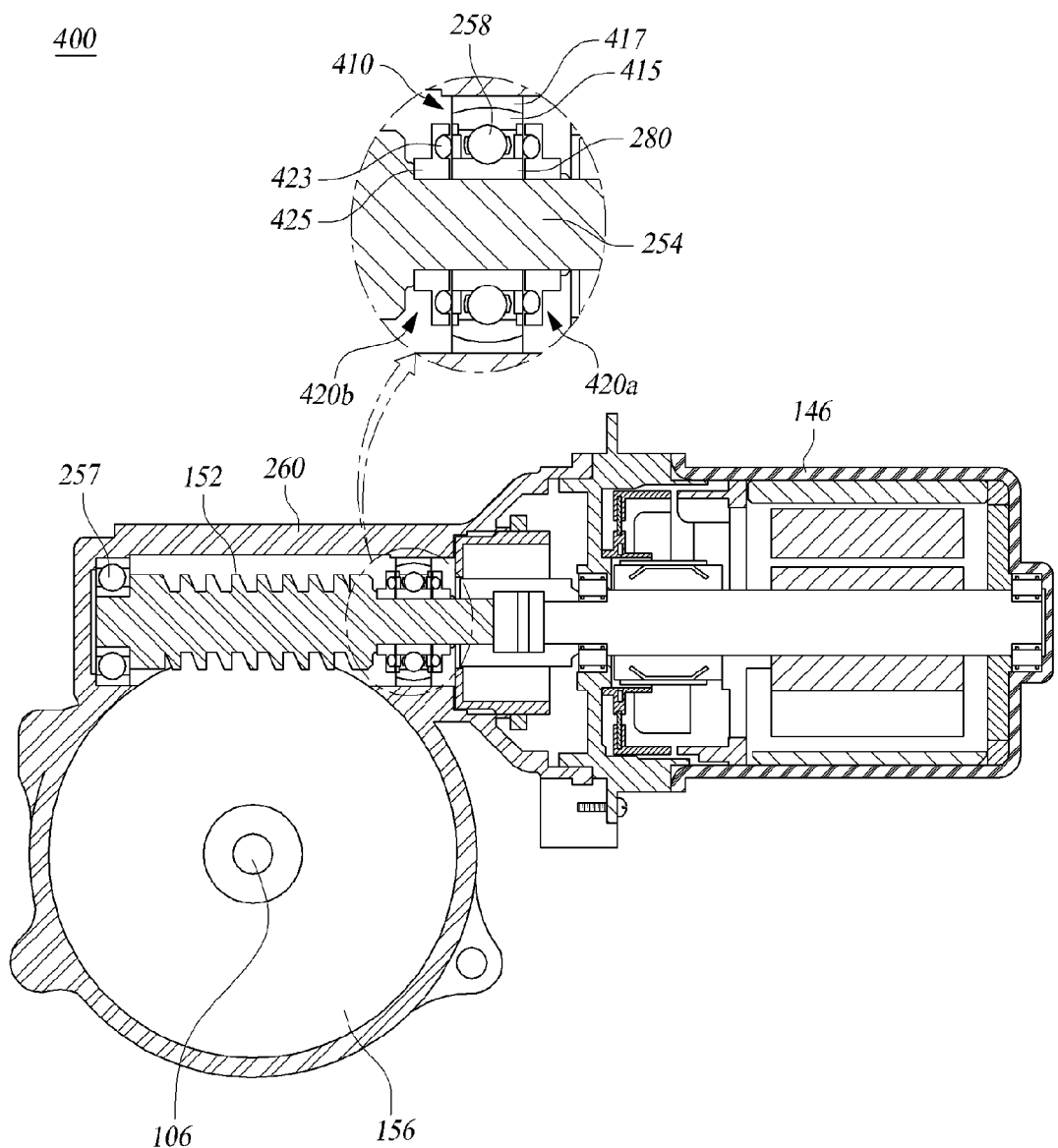
FIG. 5 shows an exploded view and a cross-sectional view illustrating a reducer of an electric power steering apparatus, according to another exemplary embodiment of the present invention.

FIG. 5 shows an exploded view and a cross-sectional view illustrating a reducer of an electric power steering apparatus, according to another exemplary embodiment of the present invention.

As shown in FIG. 5, a reducer 400 for an electric power steering apparatus, according to another exemplary embodiment of the present invention, includes: a worm shaft 254 whose one side end is coupled with a motor shaft; a pivot bearing 410 coupled with the end of the worm shaft 254's motor shaft coupling portion in such a manner that a ball 258 is coupled between an inner wheel 280 and a first outer wheel 415, and the outer circumferential surface of the first outer wheel 415, and the inner circumferential surface of a second outer wheel 417 are curvedly formed and coupled with each other to support rotation and pivot movement of the worm shaft 254; and a first bearing support 420*a* and a second bearing support 420*b* which are tightly fitted in one side and the other side of the pivot bearing 410, respectively, while being insertedly-coupled with the worm shaft 254, so as to support the worm shaft 254 and absorb a rattle noise transferred via the worm shaft 254.

The pivot bearing 410 includes the inner wheel 280, the ball 258, the first outer wheel 415, and the second outer wheel 417. Herein, the ball 258 is coupled between the inner wheel 280 and the first outer wheel 415 in such a manner that the worm shaft 254 can perform pivot movement at a predetermined angle with respect to the motor shaft coupling portion. Also, since the outer circumferential surface of the first outer wheel 415 and the inner circumferential surface of the second outer wheel 417 curvedly formed and coupled with each other, the first outer wheel 415 is supported by the inner circumferential surface of the second outer wheel 417 while the worm shaft 254 performs pivot movement.

In other words, when an impact transferred from the road via a wheel and a steering shaft 106 is transferred to a worm wheel 156, the worm shaft 254 tooth-meshing with the worm wheel 156 can absorb the impact through pivot movement for rotating at a predetermined angle with respect to the motor shaft coupling portion. Furthermore, when the pivot bearing 410 is assembled with the worm shaft 254, application of a pre load from the worm shaft 254 toward the worm wheel 156 makes it possible to reduce a rattle noise caused by an increase in backlash due to abrasion of the worm wheel 156.

Also, in both sides of the pivot bearing 410, the first bearing support 420*a* and the second bearing support 420*b* are tightly fitted, in which the first bearing support 420*a* and the second bearing support 420*b* are provided with ring-shaped elastic supporting parts 423 inside thereof, so as to dampen the rattle noise generated from the worm 152 and the worm wheel 156.

Each of the first bearing support 420*a* and the second bearing support 420*b* includes the elastic supporting part 423 tightly fitted in one side or the other side of the pivot bearing 410; and a ring-shaped support 425 housing the elastic supporting part 423 therewithin. Also, the first bearing support 420*a* and the second bearing support 420*b* are tightly fitted in both sides of the pivot bearing 410 while being insertedly coupled with the worm shaft 254.

The elastic supporting part 423 may be made of an elastic material, such as rubber, silicon, urethane, or the like so as to dampen a rattle noise generated by the worm 152 and the worm wheel 156, while the support 425 housing the elastic supporting part 423 may be made of steel or an engineering plastic material.

In the reducer of an electric power steering apparatus, with the above described shape and structure, according to the present invention, it is possible to reduce a rattle noise which can be generated by an increase in backlash due to abrasion of a worm and a worm wheel, or can be generated by an impact transferred from a road via a wheel and a steering shaft. This makes it possible to provide a comfortable driving condition to a driver.

Even though it was described above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "comprising," "including," and "having" mean that one or more corresponding components may exist unless they are specifically described to the contrary, it shall be construed that one or more other components can be included.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

What is claimed is:

1. A reducer of an electric power steering apparatus, the reducer comprising:
   a worm shaft whose one side end is coupled with a motor shaft; and
   a worm shaft bearing coupled with an end of the worm shaft's motor shaft coupling portion in such a manner that a ball coupled between an inner wheel and an outer wheel supports rotation of the worm shaft, in which an inner circumferential surface of the inner wheel is provided with a curved inner wheel pivot,
   wherein the inner circumferential surface faces an outer circumferential surface of the worm shaft.

2. The reducer of the electric power steering apparatus as claimed in claim 1, which comprises a first damper and a second damper which are tightly fitted in one side and the other side of the worm shaft bearing, respectively, while being insertedly-coupled with the worm shaft, so as to support the worm shaft and absorb a rattle noise transferred via the worm shaft, wherein each of the first damper and the second damper is provided with supporting plates at both sides thereof, and between the supporting plates, a damper made of an elastic material is coupled and formed.

3. A reducer of an electric power steering apparatus, the reducer comprising:

a worm shaft whose one side end is coupled with a motor shaft, which is provided with a curved worm shaft pivot on an outer circumferential surface of said one side end; and a worm shaft bearing coupled with an end of the worm shaft's motor shaft coupling portion in such a manner that a ball coupled between an inner wheel and an outer wheel supports rotation of the worm shaft, in which the inner wheel is coupled with the worm shaft pivot.

4. The reducer of the electric power steering apparatus as claimed in claim 3, which comprises a first damper and a second damper which are tightly fitted in one side and the other side of the worm shaft bearing, respectively, while being insertedly-coupled with the worm shaft, so as to support the worm shaft and absorb a rattle noise transferred via the worm shaft, wherein each of the first damper and the second damper is provided with supporting plates at both sides thereof, and between the supporting plates, a damper made of an elastic material is coupled and formed.

5. A reducer of an electric power steering apparatus, the reducer comprising:

a worm shaft whose one side end is coupled with a motor shaft;

a pivot bearing coupled with an end of the worm shaft's motor shaft coupling portion in such a manner that a ball is coupled between an inner wheel and a first outer wheel, and an outer circumferential surface of the first outer wheel and an inner circumferential surface of a second outer wheel are curvedly formed and coupled with each other to support rotation and pivot movement of the worm shaft; and a first bearing support and a second bearing support which are tightly fitted in one side and the other side of the pivot bearing, respectively, while being insertedly-coupled with the worm shaft, so as to support the worm shaft and absorb a rattle noise transferred via the worm shaft.

6. The reducer of the electric power steering apparatus as claimed in claim 5, wherein each of the first bearing support and the second bearing support comprises an elastic supporting part tightly fitted in one side or the other side of the pivot bearing; and a ring-shaped support housing the elastic supporting part within the support.

7. A reducer of an electric power steering apparatus, the reducer comprising:

a worm shaft whose one side end is coupled with a motor shaft;

a worm shaft bearing coupled with an end of the worm shaft's motor shaft coupling portion in such a manner that a ball coupled between an inner wheel and an outer wheel supports rotation of the worm shaft, in which an inner circumferential surface of the inner wheel is provided with a curved inner wheel pivot; and a first damper and a second damper which are tightly fitted in one side and the other side of the worm shaft bearing, respectively, while being insertedly-coupled with the worm shaft, so as to support the worm shaft and absorb a rattle noise transferred via the worm shaft, wherein each of the first damper and the second damper is provided with supporting plates at both sides thereof, and between the supporting plates, a damper made of an elastic material is coupled and formed.

* * * * *